Patented May 10, 1949

2,469,845

UNITED STATES PATENT OFFICE 2,469,845

RUBBERY COPOLYMERS OF (TRIFLUOROMETHYL) VINYL AROMATIC COMPOUNDS

Mary W. Renoll, Dayton, Ohio, assignor to Monsanto Chemical Company, St. Louis, Mo., a corporation of Delaware No Drawing. Application April 15, 1944,
Serial No. 531,284

9 Claims. (Cl. 260—74)

The present invention relates to rubbery copolymers of butadiene or butadiene compounds with (trifluoromethyl) vinyl aromatic compounds and to a method of producing the same.

This invention has as an object the provision of useful, new rubber-like products. Another object of the invention is the preparation of new, easily milled, synthetic rubbery copolymers possessing improved stress-strain characteristics.

These and other objects which will be hereinafter disclosed are provided by the following invention wherein there are prepared interpolymers of butadiene compounds and a (trifluoromethyl) vinyl aromatic compound, either in the presence or absence of other polymerizable materials. For the preparation of my new, rubber-like products I use as the diolefinic constituent a compound having the structure:

wherein R and R′ are members of the group consisting of hydrogen, chlorine or methyl, i. e., butadiene, isoprene, chloroprene, 2,3-dimethylbutadiene, 2,3-dichlorobutadiene. As the (trifluoromethyl) vinyl aromatic component of my new copolymers I employ a compound having the general formula:

wherein Ar is an aromatic hydrocarbon radical. As illustrative of compounds having the above formula may be mentioned: meta-(trifluoromethyl) styrene, ortho-(trifluoromethyl) styrene, para-(trifluoromethyl) styrene, 1 - (trifluoromethyl)-3 - vinylnaphthalene, 1-(trifluoromethyl)-4-vinylnaphthalene, 1-(trifluoromethyl)-2 - vinylnaphthalene, 4 - (trifluoromethyl) - 4′-vinylbiphenyl, etc. Compounds having the above general formula form the subject of my copending application, Serial No. 531,283 filed, April 15, 1944, now Patent 2,414,330 assigned to the same assignee as the present application.

The present copolymers are soft, elastic, rubber-like materials which may be compounded like natural rubbers and subsequently vulcanized to hard products which possess mechanical properties that surpass those of such prior synthetic rubbers as butadiene-styrene copolymer or butadiene-acrylonitrile copolymer. My new copolymers are easily processed and readily compounded, being very compatible with the ordinarily employed vulcanizing chemicals. Of great technical importance is the easy workability of my new rubbers; they may be readily milled with equipment generally employed for milling and otherwise working natural rubber. The present copolymers have very good elasticity and excellent aging properties. The compounded and vulcanized copolymers are highly suitable for the production of automobile tires, rubber footwear, rubber-coated wearing apparel, electrical insulating compositions as for coating wire, etc. They are also readily extruded or drawn into flexible fibers.

I prepare my new, synthetic rubbers by polymerization, preferably in emulsion, of a mixture containing a butadiene compound and from, say, 2% to 50% by weight of the mixture of one or more of the above-mentioned (trifluoromethyl) vinyl aromatic compounds. Particularly valuable products are obtained by using from 20% to 30% of the trifluoromethyl compound, based on the total weight of the monomeric mixture. The copolymers obtained from one of the above mentioned trifluoromethyl compounds and a chlorine-containing butadiene compound such as chloroprene or 2,3-dichlorobutadiene are characterized by extremely high resistance to heat.

The invention is further illustrated, but not limited, by the following examples:

Example 1

100 grams of a mixture consisting of 75 parts by weight of butadiene and 25 parts by weight of meta-(trifluoromethyl) styrene was agitated for 22 hours at a temperature of 50° C. in a system, held at a pH of approximately 7.1 and consisting of 0.85 gram of monosodium phosphate, 9.0 grams of disodium phosphate, 4.4 grams of a wetting agent known to the trade as "Santomerse D" (an alkylbenzene sulfonate), 0.5 gram of dodecylmercaptan, 0.5 gram of potassium persulfate and 180 grams of water. At the end of this time, 2 grams of an antioxidant such as "Santoflex B" (a reaction product of aminobiphenyl and acetone) was added to the product and the latex was coagulated with an aqueous solution of sulfuric acid and sodium chloride. There was thus obtained a 66% yield of a soft, tacky, rubbery material, which was then prepared for processing by washing free of emulsifier and drying for 16 hours at a temperature of 45° C. and a pressure of 2 mm. of mercury.

100 parts of the purified copolymer thus obtained was compounded with 40 parts of a carbon black, 3 parts of zinc oxide, 1 part of stearic acid, 1.75 parts of sulfur and 1.2 parts of a rubber vulcanization accelerator known to the trade as "Santocure" (a condensation product of mercaptobenzothiazole with cyclohexylamine) and the compounded material was cured by heating it for 60 minutes at a temperature of 142° C. The following evaluation data were obtained for the cured product, before and after aging for 24 hours in circulating air at a temperature of 100° C.:

|  | Before Aging | After Aging |
|---|---|---|
| Shore Hardness | 67 | 70 |
| Tensile Strength p. s. i | 2,325 | 2,420 |
| Young's Modulus of Elasticity (at 300% elongation) | 705 | 1,510 |
| Elongation per cent | 690 | 470 |
| Firestone Plasticity, seconds | 2 | |

The above values for tensile strength were determined on the Scott tester, according to the procedure described in the January 25, 1930, issue of "Rubber Age." Plasticity measurement was made in a Firestone plastometer, using 10 pounds of air pressure at a temperature of 82° C.

For purposes of comparison a butadiene-styrene copolymer (75:25) was prepared by the emulsifying procedure herein shown, purified, and then compounded and cured as described above for the present butadiene-meta-(trifluoromethyl)styrene copolymer. Evaluation of the resulting compounded and cured butadiene-styrene copolymer by the testing procedures employed above gave the following values:

|  | Before Aging | After Aging |
|---|---|---|
| Shore Hardness | 60 | 69 |
| Tensile Strength, p. s. i. | 1,900 | 730 |
| Young's Modulus of Elasticity (at 300% elongation) | 1,075 | |
| Elongation, per cent | 420 | 120 |
| Firestone Plasticity, seconds | 5 | |

With respect to tensile strength, modulus of elasticity, elongation and plasticity, the butadiene-meta-(trifluoromethyl)styrene copolymer surpasses the butadiene-styrene copolymer. In these respects my new, rubbery interpolymer is better after aging than the butadiene-styrene copolymer is before aging. The low Firestone plasticity of my new rubber shows that of the two it is much to be preferred with respect to ease of milling, molding, machining, extruding, etc.

Similarly valuable products are likewise obtainable by emulsion copolymerization of butadiene with other (trifluoromethyl)-substituted vinyl aromatic compounds. Instead of meta-(trifluoromethyl)styrene as employed in the above example, there may be used ortho-(trifluoromethyl)styrene, para - trifluoromethyl(styrene, any one of the isomeric (trifluoromethyl)-vinyl-naphthalenes or the (trifluoromethyl)biphenyls or mixtures of the same. Instead of employing butadiene as the diolefinic constituent of my new synthetic rubbers, I may employ other butadiene compounds of the general formula herein disclosed, for example, isoprene, 2,3-dimethylbutadiene, 2,3-dichlorobutadiene, or chloroprene.

Example 2

This example shows the effect of meta-(trifluoromethyl)styrene on aging properties of ternary copolymers prepared from monomeric mixtures containing varying proportions of butadiene, styrene and meta-(trifluoromethyl)styrene. Copolymerization of the three different monomeric mixtures containing these components in the proportions given below was effected by the emulsion process described in Example 1, and the respective products were washed, dried, compounded and cured as in Example 1. Evaluations of the cured products, before and after aging for 24 hours in circulating air at a temperature of 100° C. gave the following data:

| Copolymer Content | | | Tensile Strength | | Percent Elongation | |
|---|---|---|---|---|---|---|
| Butadiene, percent Wt. | Styrene, percent Wt. | (Trifluoromethyl) styrene, percent Wt. | Before Aging | After Aging | Before Aging | After Aging |
| 75 | 15 | 10 | 2,340 | 2,725 | 530 | 425 |
| 75 | 20 | 5 | 2,520 | 2,710 | 610 | 450 |
| 75 | 22.5 | 2.5 | 1,485 | 2,350 | 430 | 375 |
| 75 | 22.5 | 2.5 | ¹1,835 | ¹2,710 | ¹440 | ¹385 |

¹ These results were obtained for 90 minute, instead of 60 minute cures.

As shown in Example 1, in styrene-butadiene copolymers having a butadiene content of 75% the tensile strength decreases considerably upon aging and is below 2,000 p. s. i. even before aging. That inclusion of (trifluoromethyl)styrene in amounts as low as 2.5% results in the production of a copolymer whose tensile strength after aging is considerable above 2,000 p. s. i. is shown in the above table.

While the production of my new, rubbery copolymers, as shown in the above examples has been described specifically by polymerization in emulsion, other polymerizing methods may be employed, for example, polymerization in the presence of sodium or boron trifluoride, as will be apparent to those skilled in the art. Also, instead of employing the emulsifying media shown above, there may be employed other expedients of emulsification. For example, instead of using dodecylmercaptan as the modifier, there may be employed the reaction product of hydrogen sulfide and tri-isobutylene, or trichloropropionitrile, and instead of maintaining the pH by means of a mixture of phosphates, other buffer compounds may be used. Santomerse D, the wetting agent shown above, may be replaced by any other surface-active material, such as Gardinol WA, a sodium lauryl sulfate made by the E. I. du Pont de Nemours & Company, Nacconol, an alkyl aryl sodium sulfonate made by the National Aniline Company, etc. Other oxygen-liberating polymerization catalysts such as ammonium persulfate, hydrogen peroxide or benzoyl peroxide may be employed instead of the potassium persulfate. The temperature at which the emulsion polymerization is conducted may be varied over the range of 30° C. to 80° C.

For certain purposes it may be desired to incorporate into the monomeric mixtures one or more additional components which are able to enter into the copolymerizing reaction. As such added components there may be used any compound containing at least one olefinic double bond ($>C:C<$) or preferably a vinyl ($-CH:CH_2$)

or vinylidene (>C:CH₂) group. Compounds containing an olefinic double bond and in the same compound at least one negative substituent such as phenyl, substituted phenyl, chloro, bromo, cyano, carboxy, carbalkoxy (e. g. carbomethoxy, carboethoxy, etc.), carboxamido and alkoxy, may be advantageously employed. Suitable compounds are: styrene, the nuclearly substituted styrenes such as the chlor-, bromo-, or fluorostyrenes, the methyl-, ethyl-, or isopropyl styrenes, the cyanostyrenes, the amino styrenes, the nitro styrenes, or the vinyl phenols; acrylic acid or derivatives thereof such as methyl or ethyl acrylate, methyl or ethyl methacrylate, acrylonitrile or methacrylonitrile, acrylamide or methacrylamide, acrylyl chloride or methacrylyl chloride; esters of lower aliphatic acids with vinyl alcohol, for example, vinyl acetate, vinyl propionate or vinyl butyrate; vinyl halides such as vinyl chloride, vinyl fluoride; vinylidene halides such as vinylidene chloride of 1-chloro-1-fluoroethylene; unsaturated acids or their derivatives such as maleic anhydride, chloromaleic anhydride, maleonitrile, fumaronitrile, crotonic acid or its derivatives such as methyl or ethyl crotonate or crotononitrile; cinnamic acid and derivatives such as ethyl cinnamate, cinnamonitrile, etc.

A great deal of latitude may thus be exercised in selecting a third or even a fourth interpolymerizing component in the initial monomeric mixture. Generally, inclusion of a (trifluoromethyl) vinyl aromatic compound in monomeric mixtures containing butadiene as a major component confers simultaneously greater plasticity, tensile strength and elasticity to the final product, irrespective of the nature of other olefinic materials that may be present in the monomeric mixture. The ratio of the individual monomers present in the monomeric mixture may be widely varied. However, in order to assure the production of desirable rubbery materials it is recommended that at least from 2% to 30% of the total monomeric mixture be a (trifluoromethyl) vinyl aromatic compound (or a mixture of the same) and that at least 50% to 80% of said monomeric mixture be a butadiene compound. Where a third vinyl compound such as styrene is employed it may be employed in amount varying from 5% to 30% of the monomeric mixture, the balance being butadiene.

Non-rubbery materials may be obtained from a butadiene compound and a (trifluoromethyl) vinyl aromatic compound either by employing a quantity of the trifluoromethyl compound which is in excess of, say, 60% of the monomeric mixture or by thermal polymerization in mass of any mixture of a butadiene compound and one or more of the present (trifluoromethyl) vinyl aromatic compounds in the presence or absence of a catalyst. Such non-rubbery copolymers are hard, resinous masses which may be employed in the plastic and coating industries, as adhesives in the production of laminated products, as wire coating resins, etc.

It is to be understood that the foregoing detailed description is given merely by way of illustration and that many variations may be made therein without departing from the spirit of the invention.

What I claim is:

1. An interpolymer of between 2% and 50% of ar-(trifluoromethyl)styrene, the balance being butadiene.

2. An interpolymer of from 2% to 50% of ar-(trifluoromethyl)styrene, 5% to 30% of another vinyl aromatic compound, the balance being butadiene.

3. An interpolymer of 75% butadiene, 15% of styrene and 10% of meta-(trifluoromethyl)styrene.

4. An elastic vulcanizable copolymer of ar-(trifluoromethyl)styrene and butadiene, said copolymer containing from 2% to 50% of interpolymerized ar-(trifluoromethyl)styrene.

5. A copolymer of from two to 50 percent by weight of the polymerizable monomers of a compound having the structural formula:

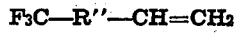

wherein R" is a divalent aromatic hydrocarbon radical, and a compound of the structural formula:

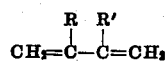

wherein R and R' are radicals of the group consisting of hydrogen, chlorine and methyl.

6. A copolymer of from 2 to 50 percent by weight of a compound having the structural formula:

wherein R" is a divalent aromatic hydrocarbon radical, and the balance of a compound having the structural formula:

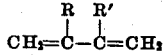

wherein R and R' are radicals of the group consisting of hydrogen, chlorine and methyl.

7. A copolymer of from two to 50 percent by weight of a compound having the structural formula:

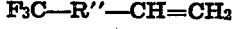

wherein R" is a divalent aromatic hydrocarbon radical, from 5 to 30 percent of a compound containing a single polymerizable olefinic double bond, and the balance of a compound having the structural formula:

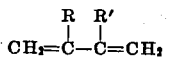

wherein R and R' are radicals of the group consisting of hydrogen, chlorine and methyl.

8. A method of preparing a copolymer which comprises subjecting a mixture of from 2 to 50 percent by weight of a compound having the structural formula:

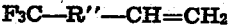

wherein the R" is a divalent aromatic hydrocarbon radical and a compound of the structural formula:

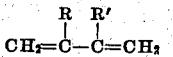

wherein R and R' are radicals of the group consisting of hydrogen, chlorine and methyl to a temperature between 30 and 80° C. and then coagulating the resultant polymer.

9. A method of preparing a synthetic rubber which comprises preparing an aqueous emulsion of from 2 to 50 percent by weight of a compound having the structural formula:

wherein R" is an aromatic hydrocarbon radical and a compound of the structural formula:

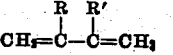

wherein R and R' are radicals of the group consisting of hydrogen, chlorine and methyl, heating the emulsion to a temperature of from 30 to 80° C. in the presence of a peroxy compound to effect polymerization, coagulating the emulsion, and separating the coagulated rubber.

MARY W. RENOLL.

REFERENCES CITED

The following references are of record in the file of this patent:

UNITED STATES PATENTS

| Number | Name | Date |
| --- | --- | --- |
| 2,226,809 | Driesbach | Dec. 31, 1940 |